US008162593B2

(12) United States Patent
Guimbard et al.

(10) Patent No.: US 8,162,593 B2

(45) Date of Patent: Apr. 24, 2012

(54) INTER-TURBINE CASING WITH COOLING CIRCUIT, AND TURBOFAN COMPRISING IT

(75) Inventors: Jean-Michel Bernard Guimbard, Cely en Biere (FR); Philippe Jean-Pierre Pabion, Vaux le Penil (FR); Sebastien Jean Laurent Prestel, Arpajon (FR); Jean-Luc Soupizon, Vaux le Penil (FR)

(73) Assignee: SNECMA, Paris (FR)

(*) Notice: Subject to any disclaimer, the term of this patent is extended or adjusted under 35 U.S.C. 154(b) by 1071 days.

(21) Appl. No.: 12/051,383

(22) Filed: Mar. 19, 2008

(65) Prior Publication Data

US 2008/0232953 A1 Sep. 25, 2008

(30) Foreign Application Priority Data

Mar. 20, 2007 (FR) ..................................... 07 02020

(51) Int. Cl.

*F01D 5/14* (2006.01)
*F03D 11/00* (2006.01)
*F04D 29/38* (2006.01)

(52) U.S. Cl. ...................... 415/115; 415/176; 415/208.2

(58) Field of Classification Search .................. 415/115, 415/142, 168.1, 175, 176, 208.1, 208.2, 209.3

See application file for complete search history.

(56) References Cited

U.S. PATENT DOCUMENTS

| | | | | |
|---|---|---|---|---|
| 4,987,736 | A * | 1/1991 | Ciokajlo et al. | 60/797 |
| 5,236,303 | A * | 8/1993 | Fowler et al. | 415/190 |
| 5,609,467 | A * | 3/1997 | Lenhart et al. | 415/142 |
| 6,185,924 | B1 * | 2/2001 | Matsumoto et al. | 60/806 |
| 6,439,841 | B1 * | 8/2002 | Bosel | 415/142 |
| 2004/0111829 | A1 | 6/2004 | Bruno et al. | |
| 2006/0123796 | A1 | 6/2006 | Aycock et al. | |
| 2007/0231123 | A1 * | 10/2007 | Dervaux et al. | 415/115 |
| 2008/0085182 | A1 * | 4/2008 | Guimbard et al. | 415/115 |
| 2008/0240845 | A1 * | 10/2008 | Drelon et al. | 403/79 |

* cited by examiner

*Primary Examiner* — Edward Look
*Assistant Examiner* — Su Htay

(74) *Attorney, Agent, or Firm* — Oblon, Spivak, McClelland, Maier & Neustadt, L.L.P.

(57) ABSTRACT

An inter-turbine casing for a turbofan is disclosed. The casing includes an outer ring, an inner ring, and an intermediate ring between the inner ring and the outer ring. The inner and intermediate rings have respective openings for the passage of cooling air. The casing includes at least one sealing device, arranged between the outer ring and the intermediate ring, with a base, provided with at least one orifice for the passage of cooling air, and a peripheral skirt which is able to be compressed and expanded elastically. The base bears against the outer ring and the peripheral skirt bears against the intermediate ring.

12 Claims, 3 Drawing Sheets

INTER-TURBINE CASING WITH COOLING CIRCUIT, AND TURBOFAN COMPRISING IT

The present invention concerns the field of turbomachines and particularly relates to the cooling of the turbines of a turbofan. It is aimed more particularly at a sealing device intended to be used in a circuit for cooling the turbines of the turbofan at the location of the inter-turbine casing of the turbofan. It is aimed at an inter-turbine casing equipped with such a sealing device. It is finally aimed at a turbofan comprising such a sealing device and/or such an inter-turbine casing.

Throughout the following, the terms "axial" and "radial" refer to an axial direction and to a radial direction of the turbofan.

BACKGROUND OF THE INVENTION AND DESCRIPTION OF THE PRIOR ART

A turbofan of an aircraft comprises, in a known manner, a primary gas flow path and a secondary gas flow path which are separated by an inter-flow path compartment of a casing known as an "inter-turbine casing". In the primary flow path are arranged, from upstream to downstream in the gas flow direction, a low-pressure compressor and a high-pressure compressor. The air thus compressed is brought to a combustion chamber in which it is mixed with pressurized fuel which is burned so that, downstream of the combustion chamber, energy is supplied to a high-pressure turbine which drives the high-pressure compressor, and to a low-pressure turbine which drives the fan and the low-pressure compressor. The gases leaving the turbines provide a residual thrust which combines with the thrust generated by the gases circulating in the secondary flow path to propel the aircraft.

FIG. 1 schematically illustrates a known architecture for the turbines of a turbofan. The low-pressure turbine 10 comprises stator blades 12 and rotor blades 14. The rotor blades 14 drive a shaft 16 rotating in a bearing 18 which, at the downstream end of said low-pressure turbine 10, is supported by an exhaust casing 20 extending radially to the outer casing 22. The high-pressure turbine 24 comprises stator blades 26 and rotor blades 28. The rotor blades 28 drive a shaft 30 rotating in a bearing 32 which, at the upstream end of the low-pressure turbine 10, is supported by an inter-turbine casing 40 extending radially to the outer casing 22, in the inter-turbine space 34. Such a turbine architecture, in which the high-pressure turbine is held on the stator of the low-pressure turbine, has the known advantage of allowing improved control of the relative movements of the two turbines, thereby reducing the operational clearances in relation to other turbine architectures.

The inter-turbine casing 40 is a structural component which comprises, in a known manner, an outer ring forming part of the outer casing and an inner ring forming part of the inner casing or hub on which the high-pressure turbine shaft bearing support is fastened. The inter-turbine casing also comprises a certain number of radial arms, which are structural components connecting the outer ring and the inner ring. It also comprises fairings 42 having a profiled shape which are arranged in the aerodynamic air duct so as to distribute the air stream coming from the high-pressure turbine before it reaches the first stage of the low-pressure turbine. The radial arms are preferably arranged inside some of these fairings, or in all of these fairings.

The thermally stressed components such as the turbine rotors, the fairings and the radial arms need to be cooled. For this purpose, it is known practice for cooling air bled from a cooler part of the turbofan to be fed through the outer ring, the fairings and the inner rings. However, on account of the expansions to which the components are subjected during operation, the fairings are divided into sectors, thus allowing an operating clearance between the various sectors. These operating clearances are, however, also sources of unwanted leaks through which some of the cooling air escapes. Such leaks cause a shortfall in the cooling circuit performance, since the quantity of cooling air is not optimized. There results a reduction in the life of the cooled components or the need to increase the flow rate of the cooling air.

SUMMARY OF THE INVENTION

The object of the invention is to overcome the aforementioned disadvantages, the invention providing a cooling circuit arrangement which minimizes the cooling air leaks.

The invention relates to an inter-turbine casing of a turbofan, the inter-turbine casing comprising an outer ring and an inner ring along with an intermediate ring between the inner ring and the outer ring, the inner and intermediate rings having respective openings for the passage of cooling air. According to the invention, the casing is distinguished in that it comprises at least one sealing device, arranged between the outer ring and the intermediate ring, with a base, provided with at least one orifice for the passage of cooling air, and a peripheral skirt which is able to be compressed and expanded elastically, the base bearing against the outer ring and the peripheral skirt bearing against the intermediate ring.

According to one additional feature, the inter-turbine casing additionally comprises structural arms which pass through said respective openings in the inner ring and intermediate ring, and the sealing device is installed between one end of one of the radial arms and said outer ring.

According to another additional feature, the sealing device is installed such that said orifice in the base is situated opposite an opening in the outer ring.

According to another additional feature, the sealing device is installed such that the peripheral skirt surrounds an opening in the intermediate ring. Preferably, the sealing device is installed such that its peripheral skirt is prestressed in compression. In particular, the sealing device is fastened to an end plate of one of the structural arms by bolts passing through fastening holes formed in its base.

According to the invention, the inter-turbine casing is additionally equipped with sleeves arranged between the intermediate ring and the inner ring, each of said sleeves bringing one of the respective openings in the intermediate ring into communication with one of the respective openings in the inner ring. Preferably, each sleeve is provided with lateral perforations for the passage of cooling air.

According to another aspect, the invention relates to a turbofan which comprises at least one inter-turbine casing.

BRIEF DESCRIPTION OF THE DRAWINGS

The invention will be better understood on reading the detailed description given below of one particular embodiment provided by way of nonlimiting indication and illustrated by means of the appended drawings, in which.

DESCRIPTION OF THE PREFERRED EMBODIMENTS

Figure 2:
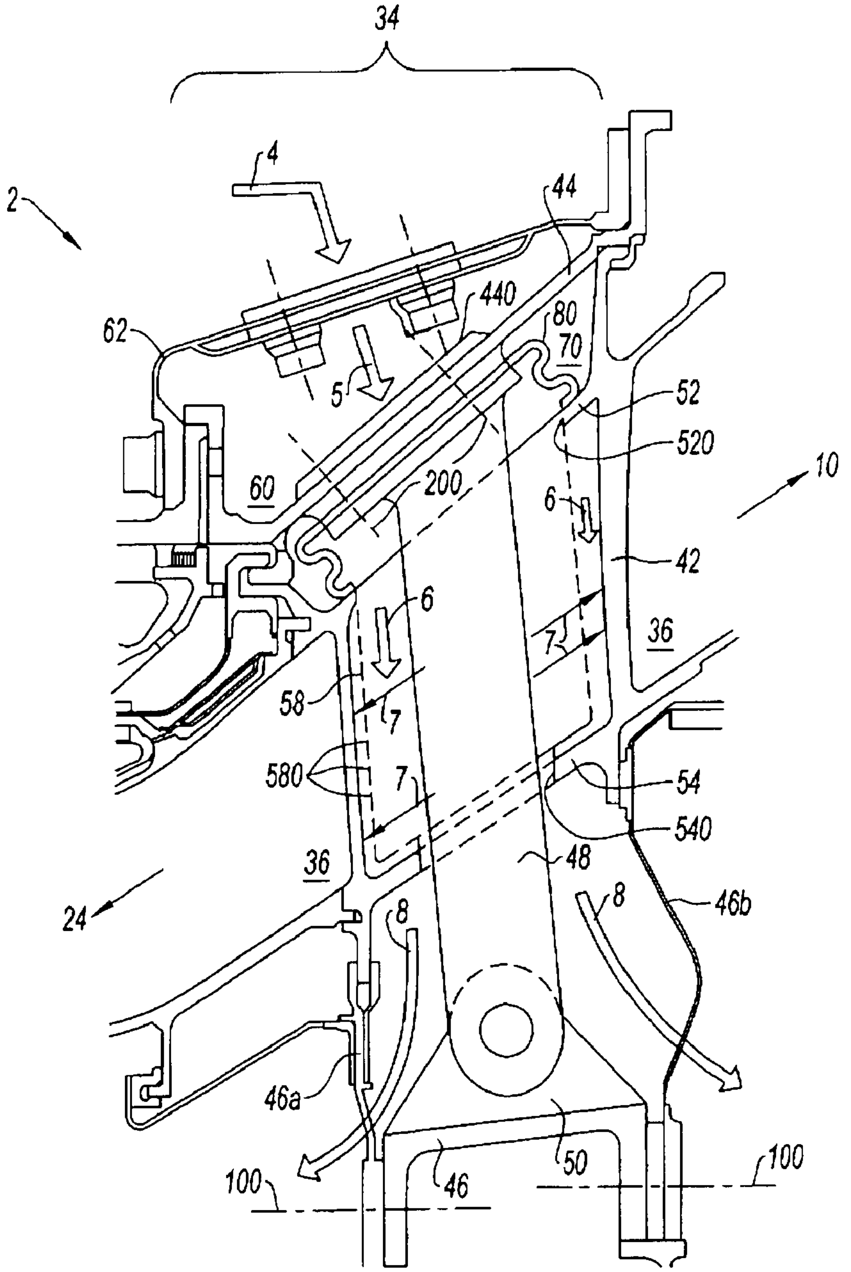
FIG. 2 represents, in axial section, an inter-turbine casing equipped with a sealing device according to the invention.

With reference to FIG. 2, there is shown part of a turbofan 2, more particularly the inter-turbine space 34 between a low-pressure turbine 10 and a high-pressure turbine 24 whose respective blades (not shown in FIG. 2) extend in an aerodynamic air duct 36. In this inter-turbine space 34 is installed an inter-turbine casing 40 comprising, in a manner known per se, an outer ring 44, an inner ring 46 fastened to a bearing support by fastening means, for example bolts, which are depicted by the reference 100, and fairings 42 fastened to the outer ring 44 and to flanges 46*a*, 46*b* secured to the inner ring 46; the fairings 42 are in fact clamped, at their internal end, between these flanges 46*a*, 46*b*. These fairings 42 have the function in particular of distributing the air stream coming from the high-pressure turbine 24 before it reaches the first stage of the low-pressure turbine 10. These fairings 42 extend in the aerodynamic air duct 36, upstream of the blades 12 of the low-pressure turbine 10. They are bounded by an outer intermediate ring 52 and an inner intermediate ring 54.

The inter-turbine casing 40 is additionally provided with sleeves 58. Each sleeve 58 is arranged inside one of the fairings 42, around a radial arm 48, and connects an opening 520 in the outer intermediate ring 52 with an opening 540 in the inner intermediate ring 54. Each sleeve 58 is additionally provided with lateral perforations 580 which are arranged facing the corresponding fairing 42.

The inter-turbine casing 40 is additionally provided with sleeves 58. Each sleeve 58 is arranged inside one of the fairings 42, around a radial arm 48, and connects an opening 520 in the outer intermediate ring 25 with an opening 540 in the inner intermediate ring 54. Each sleeve 58 is additionally provided with lateral perforations 580 which are arranged facing the corresponding fairing 42.

The cooling circuit will now be described with reference to FIG. 2. The cooling air bled from a cooler part of the turbofan, for example the high-pressure compressor, is fed, as indicated by the arrow 4, to a first enclosure 60 defined between the outer ring 44 and a manifold 62 fastened around said outer ring 44. The cooling air then passes through the outer ring 44, which is provided with openings 440 for this purpose, as indicated by the arrow 5, to a second enclosure 70 defined between the outer ring 44 and the outer intermediate ring 52. The cooling air then passes through the outer intermediate ring 52 via its openings 520. Next, it is conducted inside the sleeves 58 around the radial arms 48, as indicated by the arrows 6, and some of this air is sent to the fairings 42, through the perforations 580 in the sleeves 58, in order to cool said fairings 42, as indicated by the arrows 7. The major fraction of the cooling air passes through the inner intermediate ring 54 via its openings 540 so as then to be fed toward the inner parts of the turbofan 2 in order to cool them, as indicated by the arrows 8.

Unwanted leaks in this cooling circuit need to be reduced as far as possible to ensure that a large quantity of the cooling air which is introduced into the first enclosure 60 (arrow 4) reaches the hot inner parts of the turbines (arrow 8). The presence of the sleeves 58 inside the fairings 42 between the outer intermediate ring 52 and the inner intermediate ring 54 helps avoid such leaks at the aerodynamic air duct 36.

Potential leaks at the second enclosure 70 also need to be limited. For this purpose, the inter-turbine casing 40 is provided with sealing devices 80 installed in said second enclosure 70, which will now be described with reference to FIGS. 2 to 6.

Figure 3:
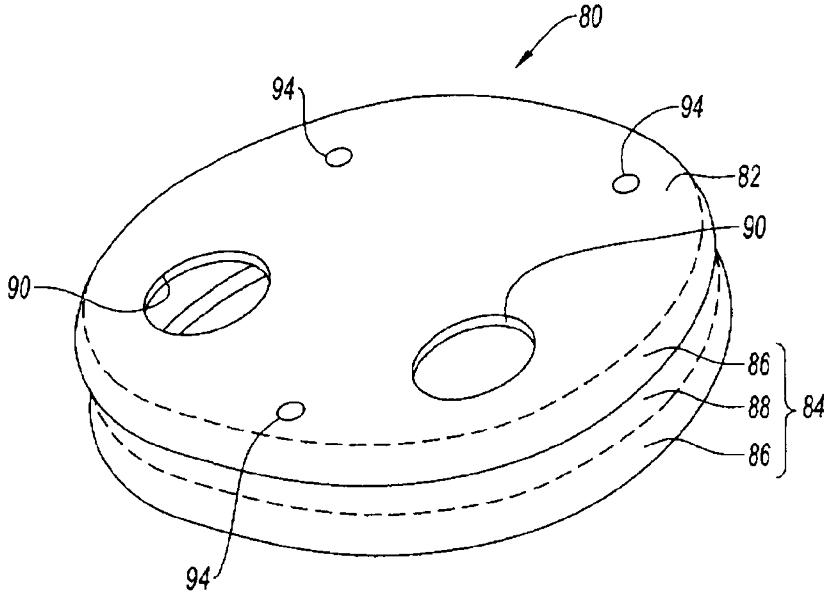
FIGS. 3 and 4 represent a top perspective view and a bottom perspective view, respectively, of a sealing device according to the invention.
Figure 4:
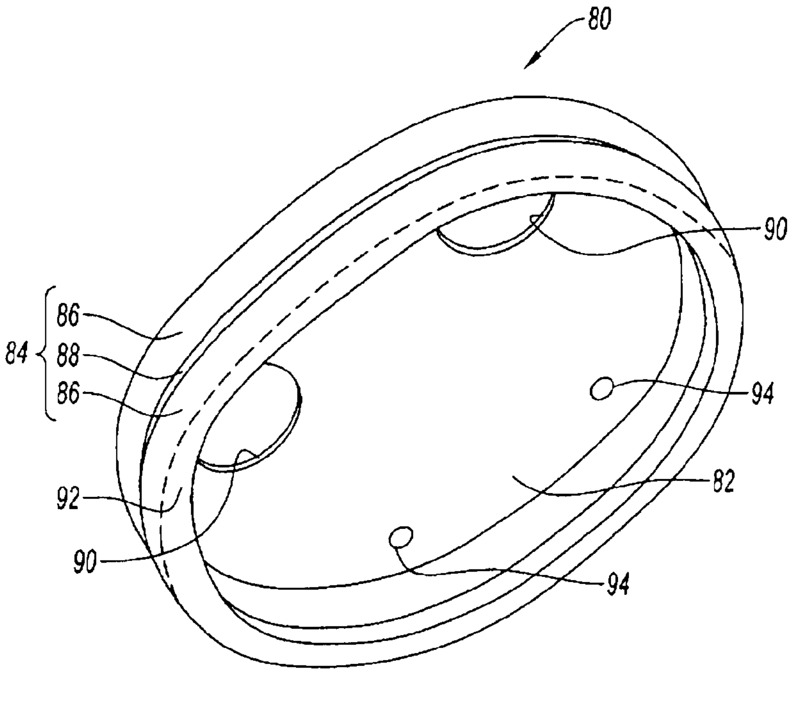

As illustrated in FIGS. 3 and 4, which represent the sealing device in a top perspective view and bottom perspective view, respectively, each sealing device 80 comprises a base 82 and a peripheral skirt 84. The base 82 takes the form of a substantially flat sheet inscribed within a circle. The peripheral skirt 84 extends from the periphery of said base 82, in a substantially perpendicular direction to the plane of said base 82, and takes the form of a bellows. In the example illustrated, this bellows comprises two projecting parts 86 separated by a set-back part 88, but it could comprise a different number of projecting parts and set-back parts. Furthermore, the sealing device 80 is provided with holes 90, there being two such holes in the example illustrated.

The peripheral skirt 84 is able to be compressed and expanded elastically. The free end of the peripheral skirt 84 is curved inwardly such that it forms a substantially planar lip 92 which is substantially parallel to the base 82. When the sealing device is installed in the second enclosure 70, as illustrated in FIG. 2, the base 82 bears against the inner face of the outer ring 44, opposite one of the openings 440 in said outer ring 44, whereas the lip 92 bears against the outer face of the outer intermediate ring 52 and surrounds one of the openings 520 in said outer intermediate ring 52. Thus, the free edge 92 (lip 92) of the peripheral skirt 84 forms a region for bearing on the outer face of the outer intermediate ring 52; this bearing region may consist, for example, of a generatrix if the lip 92 is curved such that the contact is made along a line, or of a surface if the lip 92 is formed such that the contact is a surface contact.

The sealing device 80 is installed in said second enclosure 70 while being prestressed in compression. Such an elastic configuration of the sealing device has the advantage of ensuring satisfactory sealing between the outer ring 44 and the outer intermediate ring 52 (see FIG. 2). Thus, the cooling air which passes through the opening 440 in the outer ring 44 also passes through the orifices 90 in the sealing device 80 and remains contained, at the second enclosure 70, within the volume defined by the sealing device 80. In other words, the cooling air cannot escape laterally into the second enclosure 70. An additional advantage of such a configuration lies in the fact that the sealing device 80 is able, in the manner of a spring, to absorb the relative movements between said outer ring 44 and said outer intermediate ring 52.

Figure 1:
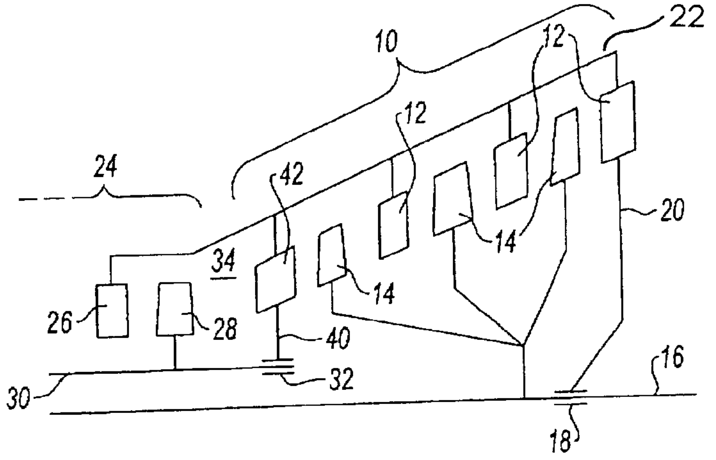
Fig. 1 BACKGROUND ART
FIG. 1, already described, represents, schematically and in axial section, an architecture for turbines of a turbofan in which the invention applies.
Figure 6:
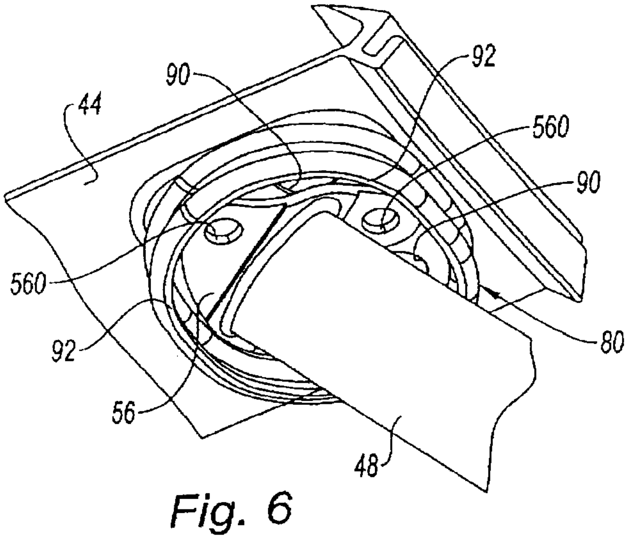
FIGS. 5 and 6 are two views, in axial section and in bottom perspective, respectively, of a sealing device installed on an outer ring and fastened to a structural arm.
Figure 5:
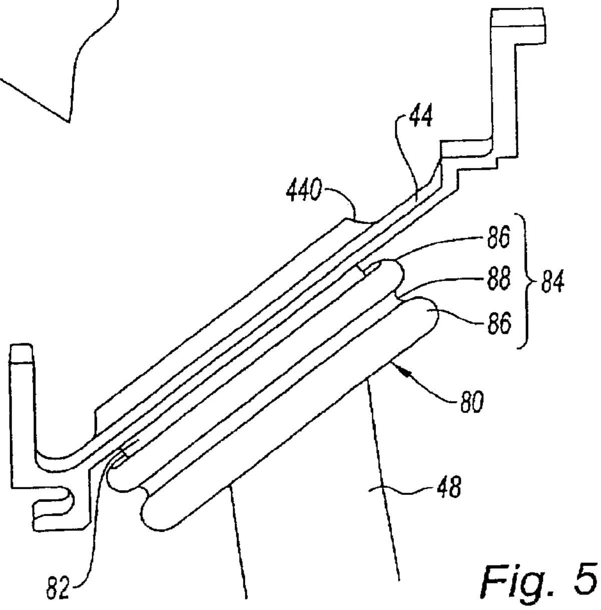

FIGS. 5 and 6 represent, in a side view and in a bottom perspective view, respectively, the fastening of a sealing device 80 to the outer ring 44 by way of a radial arm 48. FIG. 6 illustrates in more detail than FIG. 2 the fastening of the plate 56 to the outer ring 44 by means of holes 560 which are intended to accommodate fastening bolts 200 (not represented in FIG. 6). The base 82 has holes 94 intended to accommodate the fastening bolts 200, forming a passage for these fastening bolts 200. The plate 56 for fastening the radial arm 48 has a shape adapted to present an extended fastening area without covering the orifices 90 in the base 82 of the sealing device 80.

The invention claimed is:

1. An inter-turbine casing for a turbofan, comprising:

an outer ring;

an inner ring; and an intermediate ring between the inner ring and the outer ring, the inner and intermediate rings having respective openings for the passage of cooling air, wherein the casing comprises at least one sealing device, arranged between the outer ring and the intermediate ring, with a base, provided with at least one orifice for the passage of cooling air, and a peripheral skirt which is able to be compressed and expanded elastically, the base bearing against the outer ring and the peripheral skirt bearing against the intermediate ring.

2. The inter-turbine casing as claimed in claim 1, wherein the peripheral skirt extends from said base in a substantially perpendicular direction to a plane of said base.

3. The inter-turbine casing as claimed in claim 1, wherein the peripheral skirt has a free edge which is curved inwardly so as to form a bearing face.

4. The inter-turbine casing as claimed in claim 1, wherein the sealing device comprises a fastening device, arranged on the base, with holes passing through said base and accommodating fastening bolts.

5. The inter-turbine casing as claimed in claim 1, further comprising structural radial arms which pass through said respective openings in the inner ring and intermediate ring, wherein said sealing device is installed between one end of one of the structural radial arms and said outer ring.

6. The inter-turbine casing as claimed in claim 5, wherein said sealing device is installed such that at least one orifice in the base is situated opposite an opening in the outer ring.

7. The inter-turbine casing as claimed in claim 1, wherein the sealing device is installed such that the peripheral skirt surrounds an opening in said intermediate ring.

8. The inter-turbine casing as claimed in claim 1, wherein the sealing device is installed such that the peripheral skirt is prestressed in compression.

9. The inter-turbine casing as claimed in claim 5, wherein the sealing device is fastened to an end plate of one of the structural arms by bolts passing through fastening holes formed in the base.

10. The inter-turbine casing as claimed in claim 1, further comprising sleeves arranged between the intermediate ring and the inner ring, each of said sleeves bringing one of the respective openings in the intermediate ring into communication with one of the respective openings in the inner ring.

11. The inter-turbine casing as claimed in claim 10, wherein said sleeves are provided with lateral perforations for the passage of cooling air.

12. A turbofan comprising at least one inter turbine casing comprising:

an outer ring;

an inner ring; and an intermediate ring between the inner ring and the outer ring, the inner and intermediate rings having respective openings for the passage of cooling air, wherein the casing comprises at least one sealing device, arranged between the outer ring and the intermediate ring, with a base, provided with at least one orifice for the passage of cooling air, and a peripheral skirt which is able to be compressed and expanded elastically, the base bearing against the outer ring and the peripheral skirt bearing against the intermediate ring.

* * * * *